US006954306B2

(12) United States Patent
Engelhardt

(10) Patent No.: US 6,954,306 B2
(45) Date of Patent: Oct. 11, 2005

(54) SCANNING MICROSCOPE, METHOD FOR SCANNING MICROSCOPY, AND BANDPASS FILTER

(75) Inventor: Johann Engelhardt, Bad Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 12 days.

(21) Appl. No.: 10/293,733

(22) Filed: Nov. 13, 2002

(65) Prior Publication Data

US 2003/0095329 A1 May 22, 2003

(30) Foreign Application Priority Data

Nov. 17, 2001 (DE) .......................... 101 56 695

(51) Int. Cl.[7] .............................................. G02B 21/00
(52) U.S. Cl. .................... 359/381; 359/738; 359/739
(58) Field of Search ............................ 359/368, 381, 359/384, 388, 389, 738–740

(56) References Cited

U.S. PATENT DOCUMENTS 5,742,437 A * 4/1998 Eguchi et al. .............. 359/739

FOREIGN PATENT DOCUMENTS

| DE | 4330347 | 3/1995 |
|----|---------|--------|
| DE | 19902625 | 9/1999 |
| DE | 19835070 | 2/2000 |
| DE | 19944355 | 3/2001 |
| DE | 10006800 | 8/2001 |
| GB | 2344014 | 5/2000 |
| WO | 9939231 | 8/1999 |
| WO | 9942884 | 8/1999 |

OTHER PUBLICATIONS

European Search Report for EP 02 10 2510, Mar. 14, 2003 (1 page); and brief translation thereof (1 page).

* cited by examiner

Primary Examiner—Drew A. Dunn
Assistant Examiner—Joshua L Pritchett
(74) Attorney, Agent, or Firm—Davidson, Davidson & Kappel, LLC

(57) ABSTRACT

A scanning microscope with a light source for illumination of a specimen, a means for spatial spectral division of the detection light, and a detector is disclosed. The scanning microscope has means for selecting a lower limit wavelength that defines a lower exclusion region, and means for selecting an upper limit wavelength that defines an upper exclusion region, as well as a first and a second adjustable stop that block light components of the lower and the upper exclusion region of the detection light. A bandpass filter and a method for scanning microscopy are also disclosed.

19 Claims, 4 Drawing Sheets

SCANNING MICROSCOPE, METHOD FOR SCANNING MICROSCOPY, AND BANDPASS FILTER

CROSS REFERENCE TO RELATED APPLICATIONS

This application claims priority of the German patent application 101 56 695.6-42 which is incorporated by reference herein.

FIELD OF THE INVENTION

The invention concerns a scanning microscope having a light source for illumination of a specimen, a means for spatial spectral division of the detection light, and a detector.

The invention further concerns a bandpass filter for a scanning microscope.

The invention additionally concerns a method for scanning microscopy, a specimen being illuminated with illuminating light of a light source and the detection light proceeding from the specimen being spatially spectrally divided.

BACKGROUND OF THE INVENTION

In scanning microscopy, a specimen is illuminated with a light beam in order to observe the reflected or fluorescent light emitted by the specimen. The focus of an illuminating light beam is moved in a specimen plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the detection light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen travels back through the beam deflection device to the beam splitter, passes through it, and is then focused onto the detection pinhole behind which the detectors are located. Detection light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers, the track of the scanning light beam on or in the specimen ideally describing a meander (scanning one line in the X direction at a constant Y position, then stopping the X scan and slewing by Y displacement to the next line to be scanned, then scanning that line in the negative X direction at constant Y position, etc.).

German Unexamined Application DE 4330347 A1 discloses an apparatus for selection and detection of at least two spectral regions of a light beam, having a selection device and a detection device. For reliable simultaneous selection and detection of different spectral regions with high yield and with a very simple design, the apparatus is configured such that the selection device comprises means for spectral dispersion of the light beam and means on the one hand for blocking a first spectral region and on the other hand for reflecting at least a portion of the unblocked spectral region, and the detection device comprises a first detector arranged in the beam path of the blocked-out first spectral region and a second detector arranged in the beam path of the reflected spectral region. A slit diaphragm apparatus having mirror-coated diaphragm panels is preferably provided as the means for blocking a first spectral region and on the other hand for reflecting at least a portion of the unblocked spectral region. The apparatus is usable in particular as a multi-band detector in a scanning microscope.

German Unexamined Application DE 100 06 800 A1 discloses an apparatus for selection and detection of at least one spectral region of a spectrally spread-out light beam, preferably in the beam path of a confocal scanning microscope, the spread-out light beam being focusable in a focal line; and for non-overlapping detection of the spectrally spread-out light beam, the selected spectral region is characterized, in the context of an elevated number of detectors and a fault-tolerant arrangement, in that there is arranged in the spread-out light beam an optical component which reflects and/or refracts the light beam to a detector and whose optically effective region becomes smaller or larger along the surface, so that the spectral region reaching the detector is definable by means of the alignment of the component with respect to the focal line and the superposition, resulting therefrom, of the focal line and the surface.

German Unexamined Application 198 35 070 A1 discloses an arrangement for adjustable wavelength-dependent detection in a fluorescence microscope, preferably in a laser scanning microscope, comprising at least one combination, arranged in the detection beam path, of at least one short-pass filter and at least one long-pass filter to produce an adjustable bandpass, at least one filter being exchangeable with a different filter of a different wavelength characteristic and/or being adjustable in terms of its wavelength characteristic.

The arrangements disclosed in DE 4330347 A1 and DE 100 06 800 A1, which are also known by the designation "multi-band detector," are very complex and therefore expensive. They offer the capability of multi-channel detection, which is not necessary for many applications.

The arrangement known from the aforementioned German Unexamined Application 198 35 070 A1 is not very flexible, and its handling is cumbersome. A considerable number of color filters or dichroic filters must also be kept on hand. Only discrete (but not continuous) adjustment is possible.

SUMMARY OF THE INVENTION

It is therefore the object of the invention to describe a scanning microscope that permits easy and flexible detection of the detection light proceeding from a specimen within a continuously adjustable region, and moreover can be manufactured economically.

The aforesaid object is achieved by a scanning microscope having:

a light source for illumination of a specimen,
a means for spatial spectral division of detection light, means for selecting a lower limit wavelength that defines an upper limit of a lower exclusion region, and means for selecting an upper limit wavelength that defines a lower limit of an upper exclusion region, a first and a second adjustable stop that block light components of the lower and the upper exclusion region of the detection light and and a detector receiving unblocked components of the detection light.

A further object of the invention is to describe a bandpass filter that is continuously adjustable and easy to handle.

This object is achieved by a bandpass filter having:

means for selecting a lower limit wavelength that defines an upper limit of a lower exclusion region, means for selecting an upper limit wavelength that defines a lower limit of an upper exclusion region, means for spatial spectral division, a first and a second adjustable stop that block light components of the lower and the upper exclusion region.

A further object of the invention is to propose a method for scanning microscopy that makes possible spectrally continuous, flexible, specimen-specific, and easily handled detection of the light proceeding from a specimen.

This object is achieved by means of a method characterized by the following steps:

selecting a lower limit wavelength that defines a lower exclusion region;

selecting an upper limit wavelength that defines an upper exclusion region;

setting the lower exclusion region with a first adjustable stop that blocks the light components of the lower exclusion region;

setting the upper exclusion region with a second adjustable stop that blocks light components of the upper exclusion region; and detecting the unblocked light components of the detection light.

In a preferred embodiment, the means for spatial spectral division of the detection light defines a division plane, the first and the second stop being eccentrics rotatable in the plane. The eccentrics are in the form of cams and are rotatable independently of one another, each about an axis perpendicular to the division plane, with at least one drive means, preferably with stepping motors or electric motors. The drive means for setting the first and the second stop can contain a motor, a stepper motor, a galvanometer, a piezomotor, or a galvanometer. A control unit that sets the upper and lower exclusion regions defined by the user is provided to control the drive means. In another variant, the entire spectrum is continuously scannable at a constant spectral spacing of the upper and lower exclusion region, i.e. at a constant effective stop spacing.

In a very particularly preferred embodiment, the first and the second stop are rotatable eccentrics. The eccentrics are rotatable about axes that are parallel to the division plane that is defined by the means for spatial spectral division of the detection light. This embodiment eliminates the creation of flare at the stops in very particularly effective fashion. If the rotation axes extend substantially parallel to the detection light, i.e. if the cam disks (eccentrics) are perpendicular to the division plane, the detection light is limited by the eccentric in sharp-edged rather than grazing fashion, which generates less flare.

In order to achieve maximally sharp filter edges, a focusing means for focusing the spectrally divided detection light is provided. The first and the second stop are preferably arranged in the focal plane of the focusing means. The means for spatial spectral division preferably contains a prism, a grating, or a hologram.

In a preferred embodiment, the upper and lower exclusion regions are set by the user. For that purpose, the entire spectrum of the detection light is displayed graphically, e.g. in the form of a colored bar, on a display. Provided within the bar are marks, displayed as sliders, that are displaceable using a pointing device, for example a computer mouse, for adjustment within the bar.

BRIEF DESCRIPTION OF THE DRAWINGS

The subject matter of the invention is depicted schematically in the drawings and will be described below with reference to the Figures, functionally identical elements being labeled with the same reference characters. In the drawings.

DETAILED DESCRIPTION OF THE INVENTION

Figure 1:
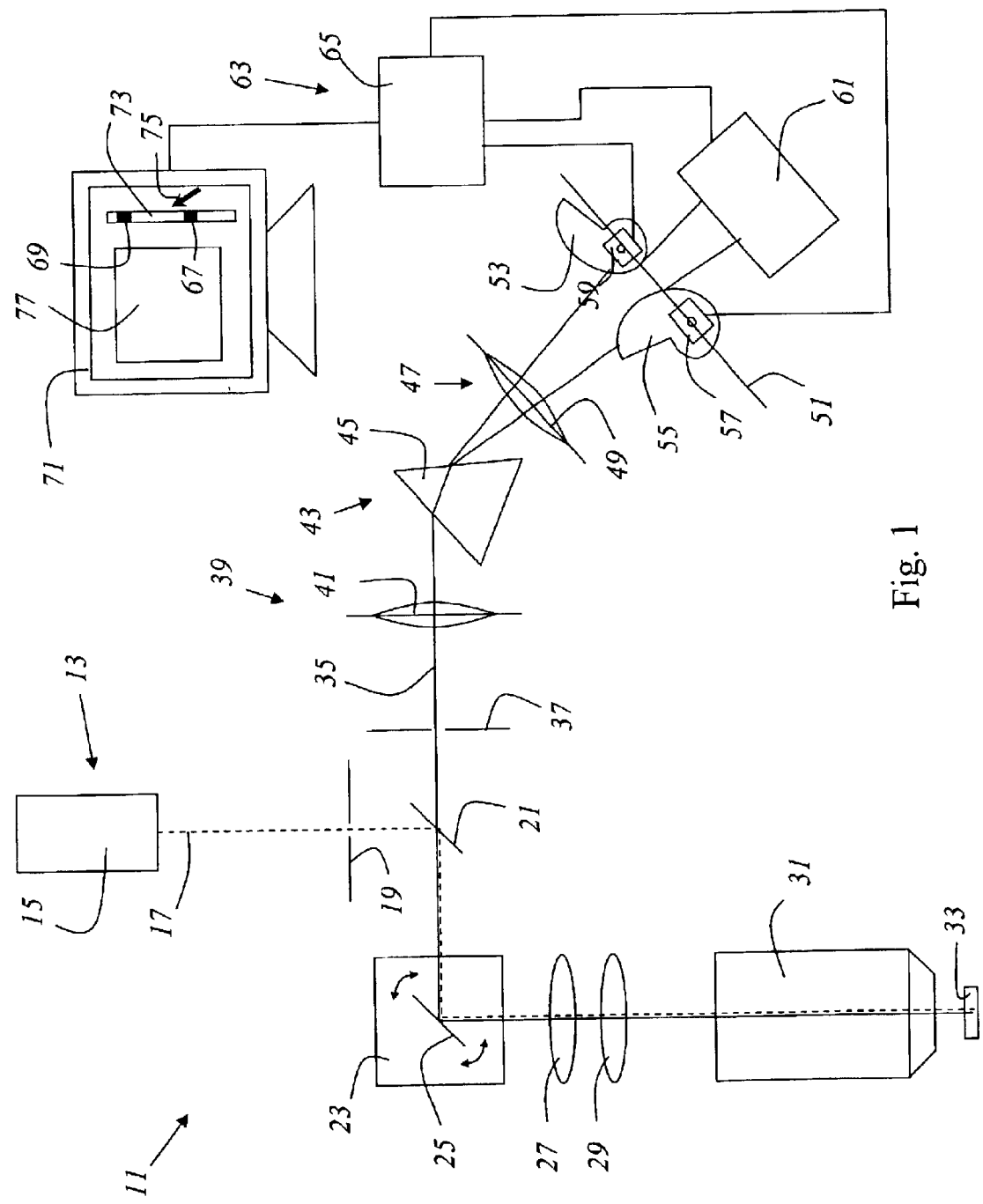
FIG. 1 shows a scanning microscope according to the present invention.

FIG. 1 schematically shows a confocal scanning microscope 11. Scanning microscope 11 comprises as light source 13 a laser 15 that emits an illuminating light beam 17. After passing through an excitation pinhole 19, illuminating light beam 17 is reflected by a beam splitter 21 to scanning module 23, which contains a gimbal-mounted scanning mirror 25 that guides the beam through a scanning optical system 27, a tube optical system 29, and a microscope optical system 31 over or through a specimen 33. In the case of non-transparent specimens 33, illuminating light beam 17 is guided over the specimen surface. With biological specimens 33 (preparations) or transparent specimens, illuminating light beam 17 can be guided through specimen 33. This means that different focal planes of the specimen are successively scanned by illuminating light beam 17. Subsequent assembly then yields a three-dimensional image of specimen 33. Illuminating light beam 17 coming from light source 3 is depicted in the illustration as a dashed line. Detection light 35 proceeding from specimen 33 travels through microscope optical system 31, tube optical system 29, scanning optical system 27, and via scanning module 23 to beam splitter 21, passes through the latter and, after passing through detection pinhole 37 and a first focusing means 39 which is embodied as a lens 41, strikes a means 43 for spatial spectral division of detection light 35, which is embodied as prism 45. Means 43 for spatial spectral division of detection light 35 defines a division plane that lies in the plane of the drawing. Spectrally divided detection light 35 is focused, with a second focusing means 47 that is configured as a lens 49, to a linear focus whose spatial position is marked by line 51. Arranged rotatably in the region of the linear focus are a first stop 53 and a second stop 55, the rotation axes being perpendicular to the division plane. First stop 53 and second stop 55 are configured as eccentrics. They cut the spatially spectrally divided detection light 35 differently depending on their rotational positions. First stop 53 is rotated by a first stepping motor 57. Second stop 55 is rotated by a second stepping motor 59.

The detection light that passes through stops 53, 55 travels to a detector 61 that is embodied as a photomultiplier. Detection light 35 proceeding from specimen 33 is depicted in the illustration with solid lines. In detector 61, electrical detected signals proportional to the power level of detection light 35 proceeding from specimen 33 are generated and are forwarded to processing unit 63, which is embodied as PC 65. PC 65 also controls first and second stepping motors 57, 59 and establishes, by way of the positions of first and second stops 53, 55, the upper exclusion region defined by the user and the lower exclusion region also defined by the user. Input of a lower limit wavelength that defines the lower exclusion region, and input of an upper limit wavelength that defines the upper exclusion region, is accomplished using a computer mouse (not depicted) and mouse pointer 75, by displacing a first mark 67 and a second mark 69 within a bar 73 depicted on a display 71. First mark 67 represents the lower limit wavelength and second mark 69 represents the upper limit wavelength. Image 77 of the specimen is displayed concurrently on the display.

Figure 2:
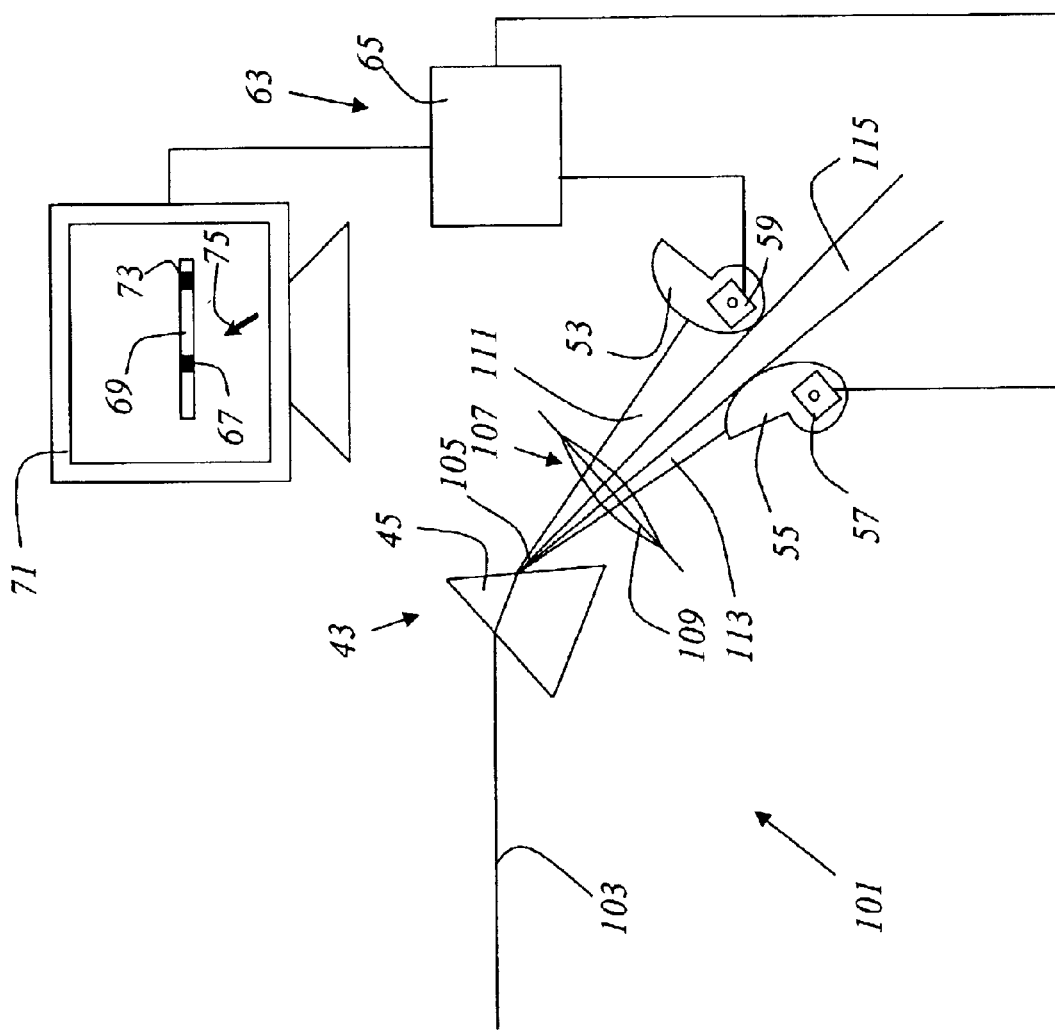
FIG. 2 shows a bandpass filter according to the present invention.

FIG. 2 shows a bandpass filter 101 according to the present invention. Bandpass filter 101 contains a means 43 for spatial spectral division that is configured as prism 45. An incident light beam 103 is spatially spectrally spread out by prism 45 into a light fan 105 and then focused by a focusing means 107 that is embodied as a converging lens 109. Bandpass filter 101 contains, as a means for selecting an upper limit wavelength, a PC 65 having a display. Input of a lower limit wavelength that defines the lower exclusion region, and input of an upper limit wavelength that defines the upper exclusion region, is accomplished using a computer mouse (not depicted) and mouse pointer 75, by displacing a first mark 67 and a second mark 69 within a bar 73 depicted on a display 71. First mark 67 represents the lower limit wavelength and second mark 69 represents the upper limit wavelength. The input could also be accomplished directly by specifying the wavelengths. First stop 53 and second stop 55 are configured as cam-shaped eccentrics that are arranged rotatably in the spreading plane. First stop 53 is rotated by a first stepping motor 57. First [sic] stop 55 is rotated by a second stepping motor 59. The first and second stepping motors are controlled by PC 65 in accordance with the inputs. Third component 115 of light fan 105 is not influenced by the first and second stops.

Figure 3:
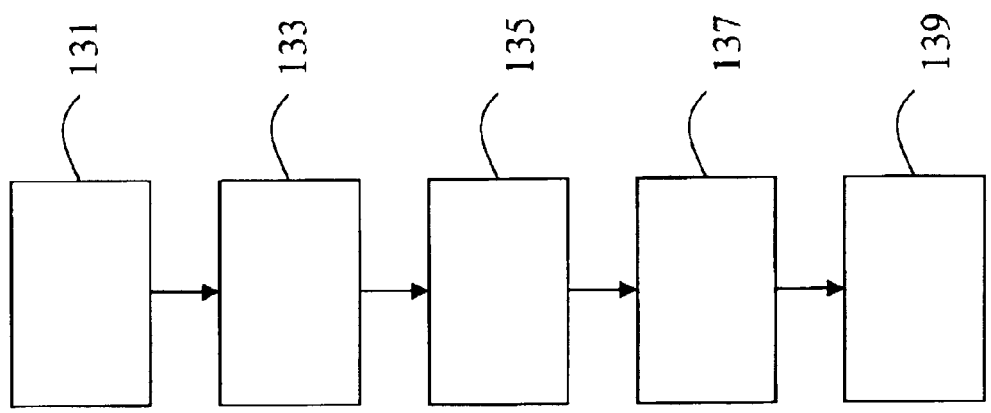
FIG. 3 is a flow chart of the method according to the present invention.

FIG. 3 is a flow chart of a method according to the present invention, a specimen being illuminated with illuminating light of a light source, and the detection light proceeding from the specimen being spatially spectrally divided. In a first step, selection 131 of a lower limit wavelength that defines a lower exclusion region is performed; preferably the lower limit wavelength selected is a few nanometers above the wavelength of the illuminating light beam. In a further step, selection 133 of an upper limit wavelength that defines an upper exclusion region is performed. If the illuminating light beam has a further wavelength, the upper limit wavelength is preferably to be selected to be less than that wavelength. The next step comprises setting 135 of the lower exclusion region with a first adjustable stop that blocks the light components of the lower exclusion region. In further steps, setting 137 of the upper exclusion region with a second adjustable stop that blocks light components of the upper exclusion region, and detection 139 of the unblocked light components of the detection light, are performed.

Figure 4:
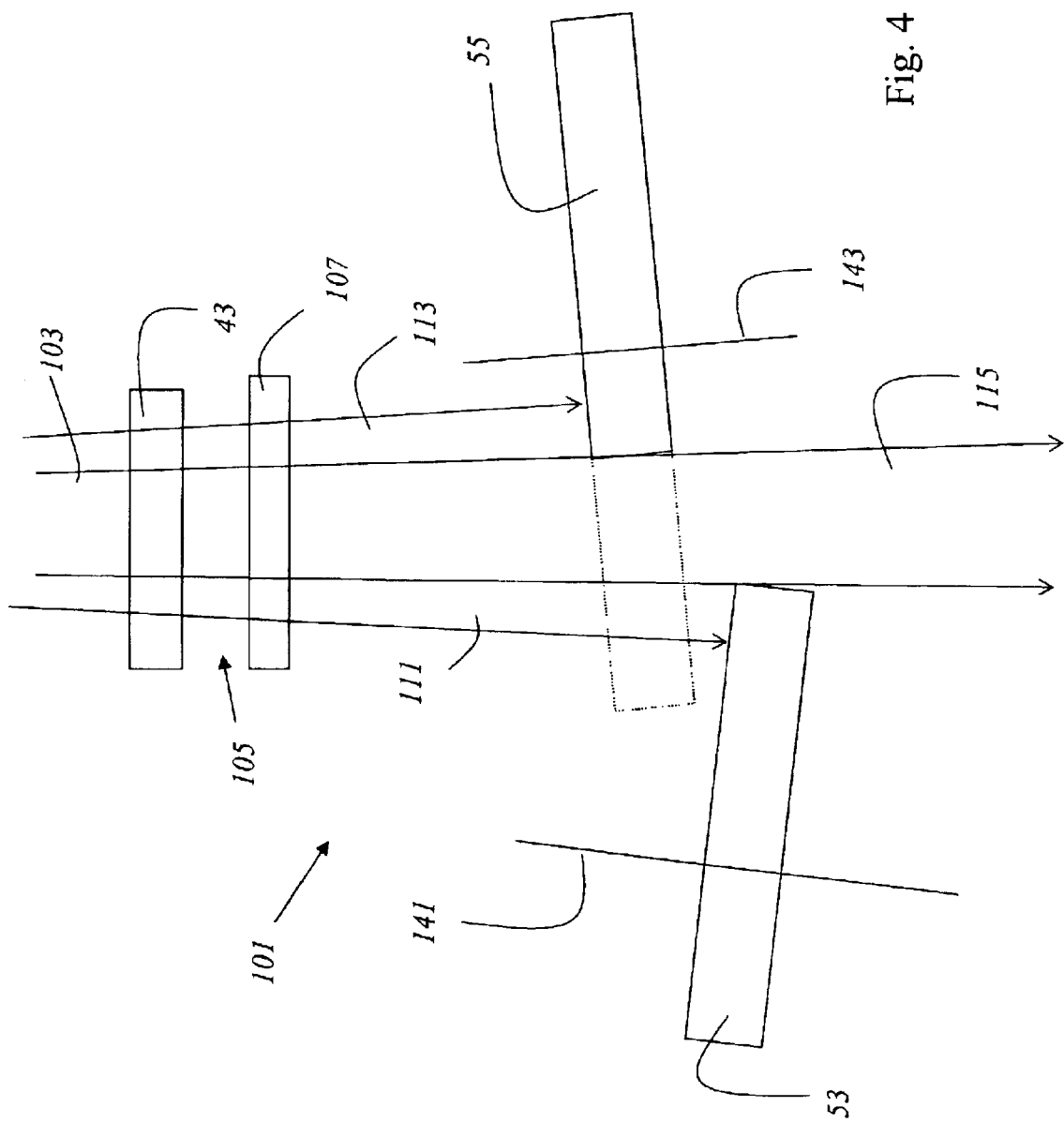
FIG. 4 shows a further bandpass filter.

FIG. 4 shows a further bandpass filter. Bandpass filter 101 contains a means 43 for spatial spectral division that is embodied as a grating. An incident light beam 103 is spread out into a light fan 105 by means 43 for spatial spectral division, and then focused by a focusing means 107. Light fan 105 contains a first component 111 that lies in the region of the upper exclusion region, a second component 113 that lies in the region of the lower exclusion region, and a third component 115 that lies between the selected upper and lower limit wavelengths. First component 111 is blocked by a first stop 53, and the second component by a second stop 55. First stop 53 is embodied as an eccentric disk about first axis 141 that lies rotatably in the spreading plane. Second stop 55 is also embodied as an eccentric disk about second axis 143 that lies rotatably in the spreading plane. Stop 53 and stop 55 are arranged at a slight offset so they do not collide.

The invention has been described with reference to a particular exemplary embodiment. It is self-evident, however, that changes and modifications can be made without thereby leaving the range of protection of the claims below.

What is claimed is:

1. A scanning microscope comprising:
   a light source for illumination of a specimen,
   a means for spatial spectral division of detection light,
   a focusing means for focusing the detection light,
   a first adjustable stop that blocks only light components having a wavelength below an upper limit of a lower exclusion region and is disposed in a focal plane of the focusing means,
   a second adjustable stop that blocks only light components having a wavelength above a lower limit of an upper exclusion region and is disposed in the focal plane of the focusing means, and
   a detector receiving unblocked components of the detection light.

2. The scanning microscope as defined in claim 1, wherein the first and the second stop are rotatable eccentrics.

3. The scanning microscope as defined in claim 2, wherein the means for spatial spectral division of the detection light defines a division plane, and the first and the second stop are rotatable in the division plane.

4. The scanning microscope as defined in claim 2, wherein the means for spatial spectral division of the detection light defines a division plane, and the first and the second stop are rotatable about axes parallel to the division plane.

5. The scanning microscope as defined in claim 1, wherein the means for spatial spectral division contains a prism, a grating, or a hologram.

6. The scanning microscope as defined in claim 1, wherein at least one drive means is provided for setting the first and the second stop.

7. The scanning microscope as defined in claim 6, wherein the drive means contains a motor, a stepper motor, a galvanometer, a piezomotor, or a galvanometer.

8. The scanning microscope as defined in claim 6, wherein the drive means is controlled by a PC.

9. A bandpass filter comprising:
   means for spatial spectral division of light,
   a focusing means for focusing the light,
   a first adjustable stop that blocks only light components having a wavelength below an upper limit of a lower exclusion region and is disposed in a focal plane of the focusing means,
   a second adjustable stop that blocks only light components having a wavelength above a lower limit of an upper exclusion region and is disposed in the focal plane of the focusing means.

10. The bandpass filter as defined in claim 9, wherein the first and the second stop are rotatable eccentrics.

11. The bandpass as defined in claim 9, wherein the means for spatial spectral division of the detection light defines a division plane, and the first and the second stop are rotatable in the division plane.

12. The bandpass as defined in claim 9, wherein the means for spatial spectral division of the detection light defines a division plane, and the first and the second stop are rotatable about axes parallel to the division plane.

13. The bandpass filter as defined in claim 9, wherein the bandpass filter is positionable in a beam path of a scanning microscope.

14. The bandpass filter as defined in claim 9, wherein at least one drive means is provided for setting the first and the second stop.

15. The bandpass filter as defined in claim 14, wherein the drive means is controlled by a PC.

16. A method for scanning microscopy, a specimen being illuminated with illuminating light of a light source and the detection light proceeding from the specimen being spatially spectrally divided, the method comprising:

focusing the detection light using a focusing means;

setting the lower exclusion region with a first adjustable stop that blocks only light components having a wavelength below an upper limit of a lower exclusion region, the first adjustable stop being disposed in a focal plane of the focusing means;

setting an upper exclusion region with a second adjustable stop that blocks only light components having a wavelength above a lower limit of the upper exclusion region, the second adjustable stop being disposed in the focal plane of the focusing means; and detecting the unblocked light components of the detection light.

17. The method as defined in claim 16, wherein the first and the second stop are rotatable eccentrics.

18. The method as defined in claim 16, wherein the means for spatial spectral division of the detection light defines a division plane, and the first and the second stop are rotatable in the division plane.

19. The method as defined in claim 16, wherein the means for spatial spectral division of the detection light defines a division plane, and the first and the second stop are rotatable about axes parallel to the division plane.

* * * * *